United States Patent [19]
Sugawara

[11] Patent Number: 5,316,239
[45] Date of Patent: May 31, 1994

[54] SPINNING REEL WITH OSCILLATING MECHANISM

[75] Inventor: Kenichi Sugawara, Sakai, Japan

[73] Assignee: Shimano Inc., Osaka, Japan

[21] Appl. No.: 726,285

[22] Filed: Jul. 5, 1991

[30] Foreign Application Priority Data

Jul. 10, 1990 [JP] Japan ................... 2-73521[U]
Jul. 26, 1990 [JP] Japan ................... 2-80106[U]

[51] Int. Cl.5 ........................................ A01K 89/00
[52] U.S. Cl. ............................... 242/241; 242/319
[58] Field of Search ........... 242/241, 242, 246, 307, 242/308, 322, 319

[56] References Cited

U.S. PATENT DOCUMENTS

| | | | |
|---|---|---|---|
| 2,229,470 | 1/1941 | Pezon | 242/307 X |
| 4,163,528 | 8/1979 | Egasaki et al. | 242/307 X |
| 4,477,038 | 10/1984 | Yorikane | 242/308 |
| 4,618,107 | 10/1986 | Nakajima | 242/307 |
| 4,702,432 | 10/1987 | Kaneko et al. | 242/246 |
| 4,865,262 | 9/1989 | Tsunoda | 242/241 |
| 4,951,897 | 8/1990 | Takeuchi | 242/246 |

FOREIGN PATENT DOCUMENTS

| | | |
|---|---|---|
| 0054425 | 12/1981 | European Pat. Off. . |
| 61-6766 | 2/1986 | Japan . |
| 2205721 | 5/1988 | United Kingdom . |

Primary Examiner—Daniel P. Stodola
Assistant Examiner—Michael R. Mansen
Attorney, Agent, or Firm—Dickstein, Shapiro & Morin

[57] ABSTRACT

A spinning reel includes a reel body having at a front position thereof a rotor rotatable by a force from a handle and an oscillating mechanism housed in the reel body. The oscillating mechanism includes a worm shaft rotatable by a force from a component associated with the handle, a pawl member engageable with an endless spiral groove defined in the worm shaft and a transmission member for transmitting a moving force from the pawl member to a spool shaft. A guide member is attached to the reel body. This guide member comes into sliding contact with the transmission member thus maintaining stable a posture of the transmission member during a movement thereof.

3 Claims, 5 Drawing Sheets

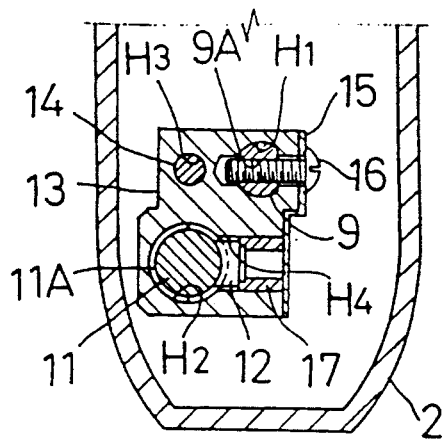

SPINNING REEL WITH OSCILLATING MECHANISM

BACKGROUND OF THE INVENTION

1. Field of the Invention

The present invention relates to a spinning reel, and more particularly to a spinning reel including an oscillating mechanism housed in a reel body, the mechanism having a worm shaft rotatable by force from a component associated with a handle and a pawl member engageable with an endless spiral groove defined in a peripheral face of the worm shaft and a transmission member for transmitting a force from the pawl member to a spool shaft.

2. Description of the Related Art

In conventional spinning reel of the above-noted type, as shown in FIG. 12, the oscillating mechanism includes a worm shaft 11, a spool shaft 9 and a transmission member 13'. In this type of oscillating mechanism, in order to eliminate mechanical looseness resulting from play provided between the spiral groove 11A and the pawl member 12 and between the worm shaft 11 and the transmission member 13', a predetermined face of the transmission member 13' is placed in slight contact with a predetermined inner face of the reel body 2, so that during a movement of the transmission member 13' the sliding slight contact between the faces serves to stabilize the moving posture of the transmission member 13'.

Incidentally, such predetermined amount of play gap is generally provided between the worm shaft 11 and the transmission member 13' for the purpose of obtaining smooth mechanical movements of these members by avoiding distortion.

However, the reel body of the spinning reel is generally manufactured by molding of e.g. a resin material; and therefore, the reel body may be deformed, due to e.g. internal stress, when and after the molded reel is withdrawn from the metal mold. For instance, if such deformation occurs as denoted with a virtual line L in FIG. 12, within the moving stroke of the transmission member 13', there are formed a region where the transmission member 13' comes into too strong contact with the reel body 2 and a further region where these components 2, 13' hardly come into contact with each other. This interferes with smooth and uniform movement of the transmission member 13' and also creates undesirable looseness in the transmission member 13'.

The same inconvenience will occur if the reel is accidentally dropped onto or struck against a hard object such as a concrete face.

The unsmooth movement provides a user with uncomfortable and uneven operation feel.

Accordingly, the primary object of the present invention is to provide an improved spinning reel which constantly allows smooth spinning action even when deformation occurs in the reel body.

SUMMARY OF THE INVENTION

For accomplishing the above-noted object, a spinning reel, according to the present invention, comprises:

a reel body having, at a front position thereof, a rotor rotatable by a force from a handle;

an oscillating mechanism housed ion the reel body; the mechanism including a worm shaft rotatable by a force from a component associated with the handle, a pawl member engageable with an endless spiral groove defined in the worm shaft and a transmission member for transmitting a moving force from the pawl member to a spool shaft; and a guide member attached to the reel body, the guide member coming into sliding contact with the transmission member thus maintaining stable a posture of the transmission member during a movement thereof.

Functions and effects of the above-described construction will be described next.

The above-described construction can be embodied as shown in FIGS. 1 through 3, for example. In this construction, during a movement of the transmission member 13, the guide member 14 comes into sliding contact with this transmission member 13, thus stabilizing the posture of the transmission member 13 during its movement, without the transmission member 13 having to come into contact with the reel body 2. Further, since this transmission member is different also from another type of conventional transmission member which is moved along a rail integrally formed with a bottom inner face of the reel body 2, there occurs no looseness in the vertical direction as well. Consequently, with the construction of the present invention, the moving posture of the transmission member can be maintained stable in both the horizontal and vertical directions.

Accordingly, the invention has fully achieved its intended object of providing an improved spinning reel which constantly allows smooth spinning action even when deformation occurs in the reel body.

Further and other objects, features and effects of the invention will become more apparent from the following more detailed description of the embodiments of the invention with reference to the accompanying drawings.

BRIEF DESCRIPTION OF THE DRAWINGS

FIG. 2 is a vertical section of a transmission member, FIG. 3 is a side view showing an arrangement of a transmission member of the reel, FIG. 4 is a perspective view of a pawl member and a bush, FIG. 5 is a front view of a click mechanism, FIG. 12 is a partial side view showing a conventional construction.

DESCRIPTION OF THE PREFERRED EMBODIMENTS

Preferred embodiments of a spinning reel relating to the present invention will now be described in details with reference to the accompanying drawings.

Figure 1:
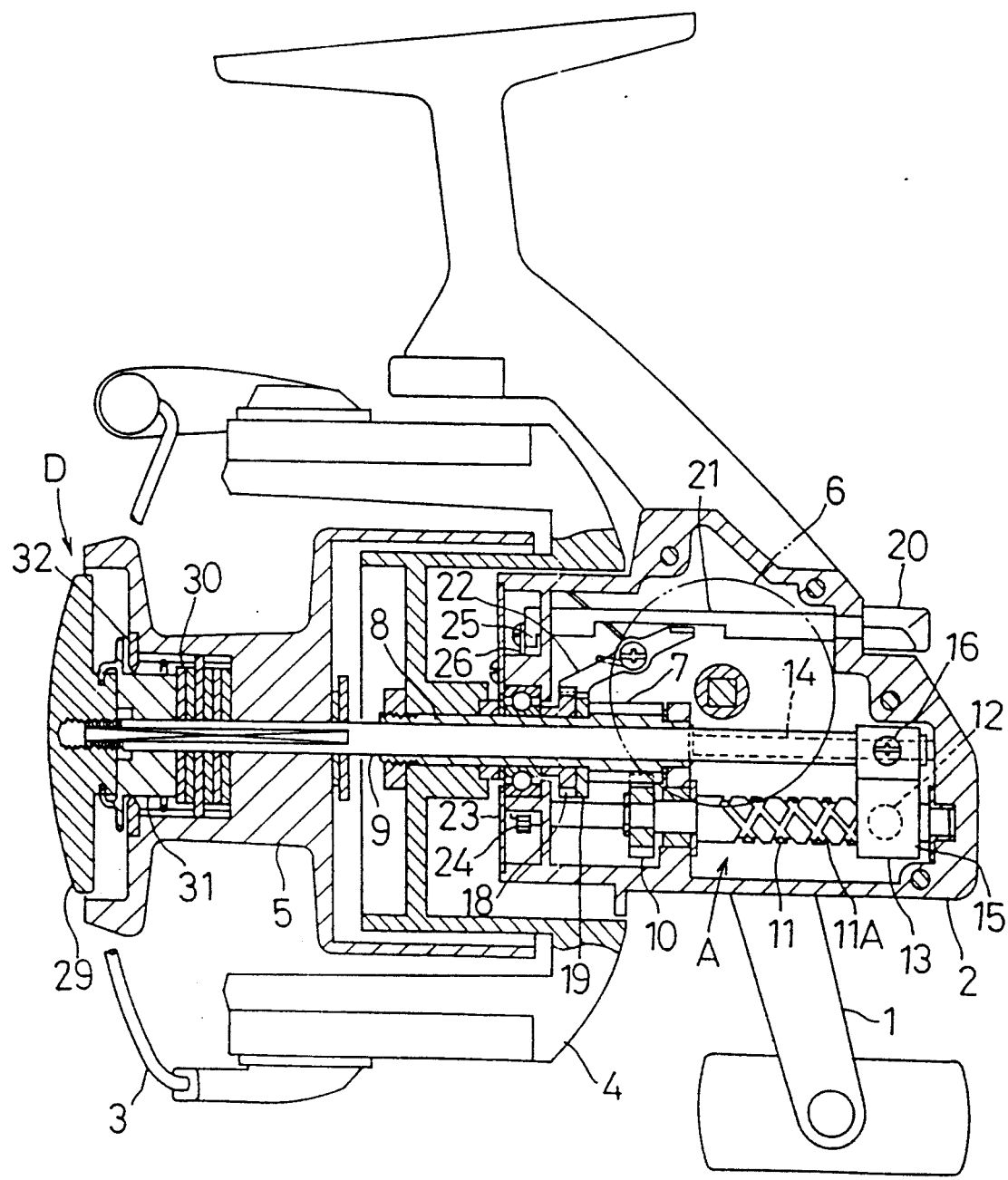
FIG. 1 is a side view in vertical section showing a spinning reel according to one preferred embodiment of the present invention.

Refering to FIG. 1, a spinning reel includes a reel body 2 formed of a resin material and having a handle 1, a rotor 4 having a bail arm 3, a spool 5, the rotor 4 and the spool 5 being housed at forward positions in the reel body 2, a transmission unit for transmitting a force from a drive gear 6 driven by the handle 1 to the rotor 4 through a pinion gear 7 and a cylinder shaft 8, and an oscillating mechanism A for converting the rotational force from the pinion gear 7 into a reciprocating force and transmitting this reciprocating force to a spool shaft 9.

As shown in FIGS. 1 through 3, the oscillating mechanism A includes a worm shaft 11 carrying at a terminal end thereof an input gear 10 meshing with the pinion gear 7, a pawl member 12 engageable with an endless spiral groove 11A defined in an outer periphery of the worm shaft 11 and a transmission member 13 for transmitting a moving force from the pawl member 12 to the spool shaft 9.

Further, in order to avoid excessive mechanical looseness during the movement of the transmission member 13 resulting from a predetermined play provided between this transmission member 13 and the worm shaft 11 for the purpose obtaining smooth operation, the movement of the guide member 13 is guided by and along a metal rod type guide member 14 which comes into sliding contact with the transmission member 13 for maintaining stable the moving posture of the transmission member 13.

More particularly, the transmission member 13 includes a first through hole H1 for inserting therethrough a rear end of the spool shaft 9, a second through hole H2 for inserting the worm shaft 11, a third through hole H3 for inserting the guide member 14, and a pawl accommodating hole H4 formed in continuous communication with the second through hole H2 so as to accommodate the pawl member 12. Further, to a side face of this transmission member 13, a plate 15 is attached, by means of a bolt 16, for closing the open end of the pawl accommodating hole H4.

The bolt 16 comes into screw engagement with a screw hole 9A defined in the spool shaft 9; and the pawl member 12, as shown particularly in FIG. 4, is accommodated at the accommodating hole H4 through a bush 17 fitted on the pawl member 12. Further, the guide member 14 is disposed in parallel with the spool shaft 9 and has its opposed ends supported to the reel body 2.

As shown in FIG. 1, this spinning reel further comprises an anti-reverse mechanism including a ratchet wheel 18 rotatable in unison with the cylinder shaft 8, a cam disc 10 loosely fitted on the cylinder shaft 8 through a friction transmitting mechanism (not to be detailed here) and a ratchet claw 22 whose posture is regulated by a cam rod 21 correlating with a switch lever 20. As also shown in FIG. 1, with the posture of the cam rod 21 being regulated, since the cam disc 19 allows a pivotal motion of the ratchet claw 22 in its engaging direction when a reverse rotating force acts on the handle 1 or the rotor 4, engagement is established between this ratchet claw 22 and the ratchet wheel 18. On the other hand, when a forward rotating force applied to the cylinder shaft 8, an outer face of the cam disc 19 pushes upwards the ratchet claw 22 in its disengaging direction, this forward rotation is allowed without the engagement between the ratchet claw 22 and the ratchet wheel 18.

Further, as shown in FIG. 5, the spinning reel includes a click mechanism, at a forward position thereof, for generating click sound only when the rotor 4 is rotated in a line takeup direction with the prevention of the reverse rotation and with the click mechanism being closed by a lid member 23. This click mechanism includes a gear member 24 fitted to a front end of the worm shaft 11, a link element 26 operable by an arm 25 fitted to a leading end of the cam rod 21 and a click claw 28 pivotally supported to a terminal end of the link element 26 and urged by means of a spring 27 so that a terminal end of the claw 28 comes into engagement with the gear member 24. And, the click mechanism is so constructed as not to generate the click sound the switch lever 20 is operated to a direction for rendering the anti-reverse mechanism inoperable.

Moreover, between a press knob 29 and friction plates 30 of a drag mechanism D housed inside the spool 5, there is interposed an intermediate member 31 slidable relative to the spool shaft 9 so as to prevent the press knob 29 from being loosened during rotation of the spool 5. A seal 32 is interposed between an outer periphery of this intermediate member 31 and the spool 5.

Incidentally, it is conceivable to form the guide member as a rail type member having substantially C-shaped, center-recessed cross section, so that the opposed sides of this rail-like guide member hold the transmission member therebetween. Further alternately, the guide member can be constructed to have a center-projecting cross section with forming a corresponding recess in the transmission member.

Some other embodiments of the present invention will be specifically described next.

Figure 6:
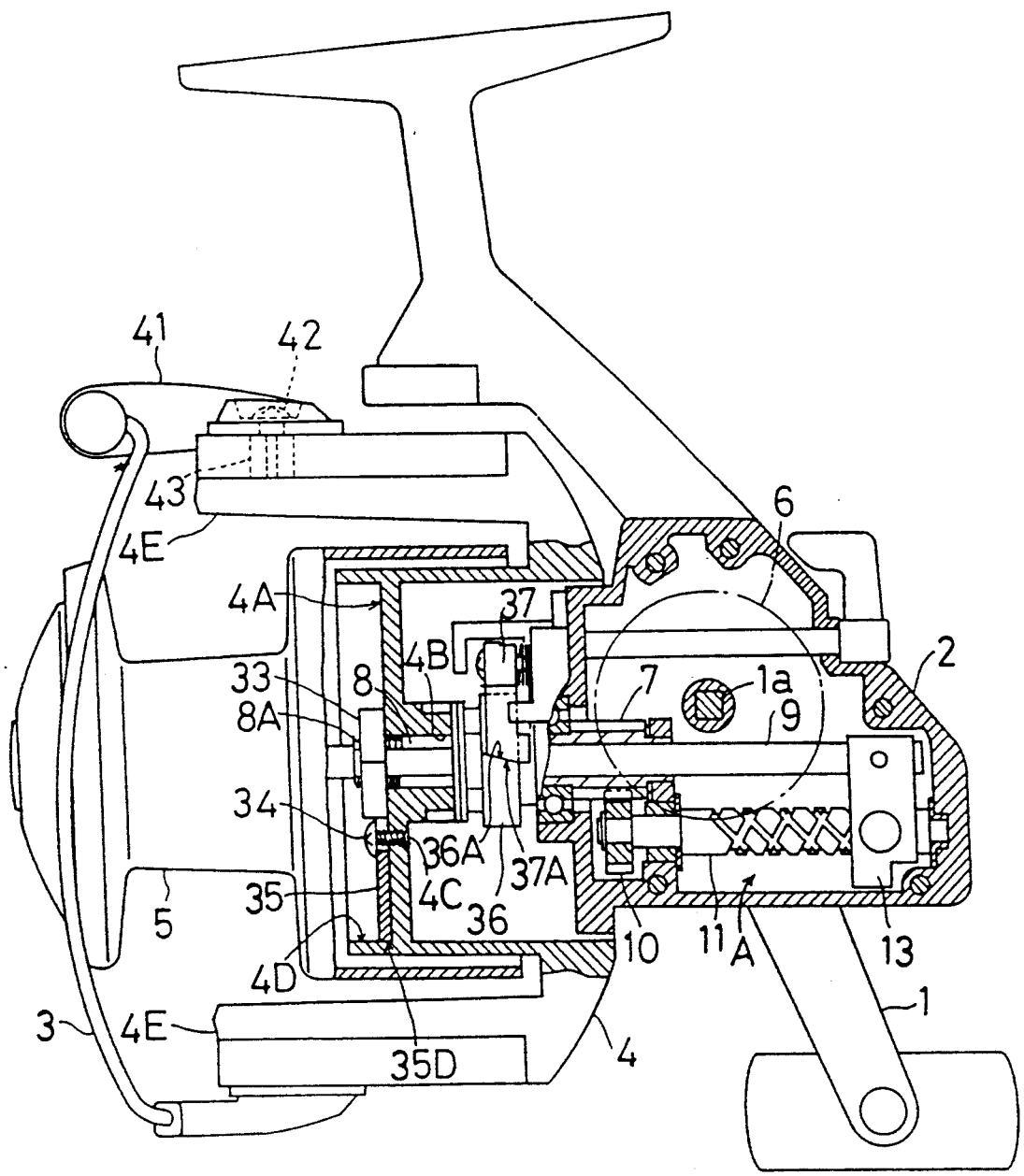
FIG. 6 is a side view in vertical section showing a spinning reel according to a further embodiment of the present invention.
Figure 7:
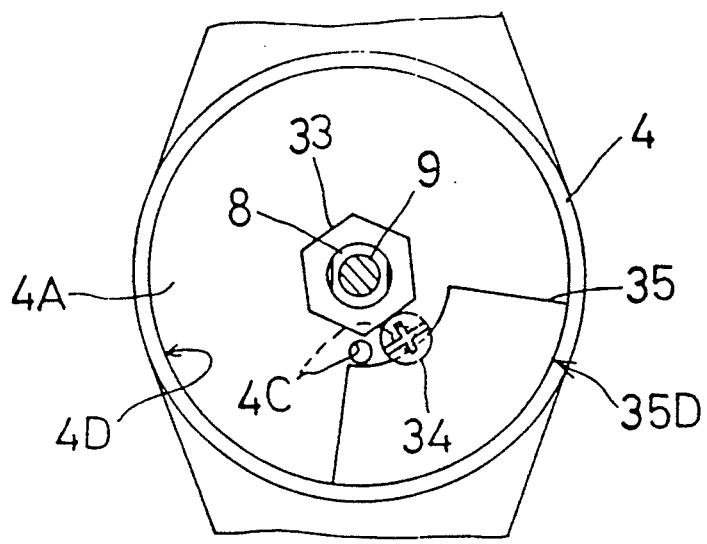
FIG. 7 is a front showing a screw member, a balancer, etc.

In a second preferred embodiment of the present invention, as shown in FIGS. 6 and 7, the cylinder shaft 8 (an example of a shaft member) is inserted into a through hole 4B defined in a disc portion 4A of the rotor 4; and the rotor 4 and the cylinder shaft 8 are connected with each other by tightening a nut element 33 screw-engageable with a threaded portion 8A of the cylinder shaft 8. And, a bolt element 34 screw-engageable with one of a plurality of screw holes 4C defined in the disc portion 4A serves to prevent loosening of the nut element 33 and also to fixedly position a balancer 35 to be attached to the disc portion 4A.

This balancer 35 is constructed as a fan-shaped metal element. For assembling the balancer 35, its outer-edge portion 35b is placed into abutment against a peripheral wall portion 4D of the rotor 4; and in this condition, an inner edge portion of the balancer 35 is fixedly tightened by means of the bolt element 34. With this assembled condition, the balancer 35 can effect stepless balance position adjustments.

On the other hand, reverse rotation of the rotor 4 is prevented by engagement between a stopper disc 36 and a stopper arm 37 attached to the cylinder shaft 8. Further, an abutment portion 36A of the stopper disc 36 and an abutment portion 37A of the stopper arm 37 are slanted, as shown in FIG. 6, so as to disperse force resulting from preventing the reverse rotation.

Figure 8:
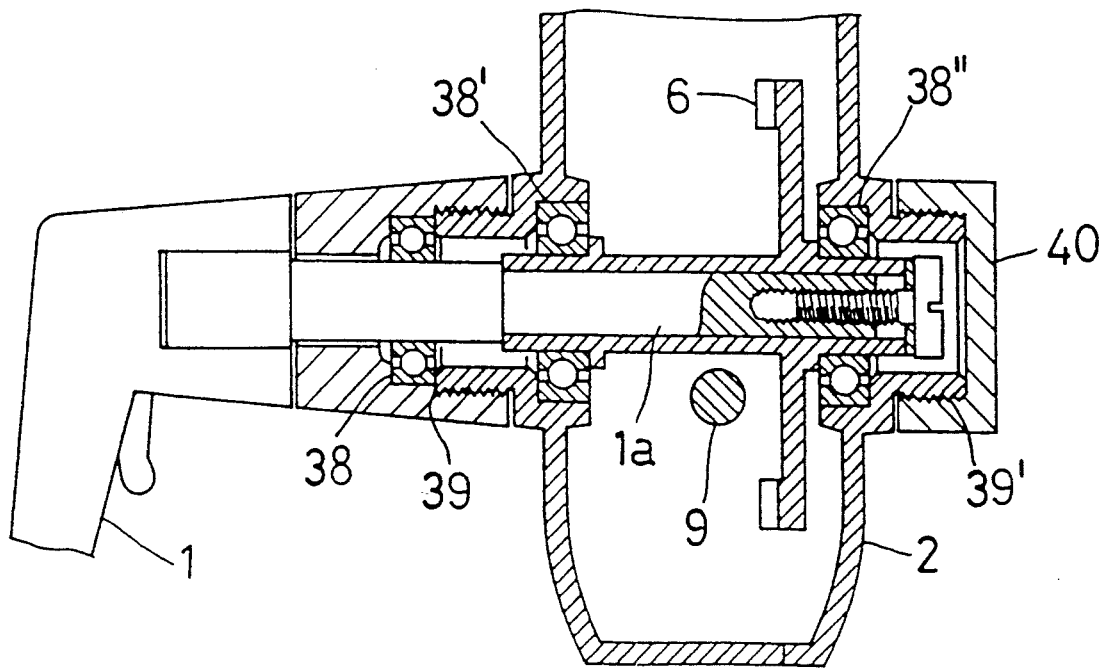
FIG. 8 is plane view in section of a reel body.

Further, as shown in FIG. 8, in this spinning reel, the drive gear 6 is supported to the reel body 2 through a pair of bearings 38', 38"; while a handle shaft 1a too is supported at a terminal position of one boss portion 39 of the reel body 2 through further pairs of bearings 38. The other boss portion 39' of the reel body 2 is fitted with a cap 40.

Figure 9:
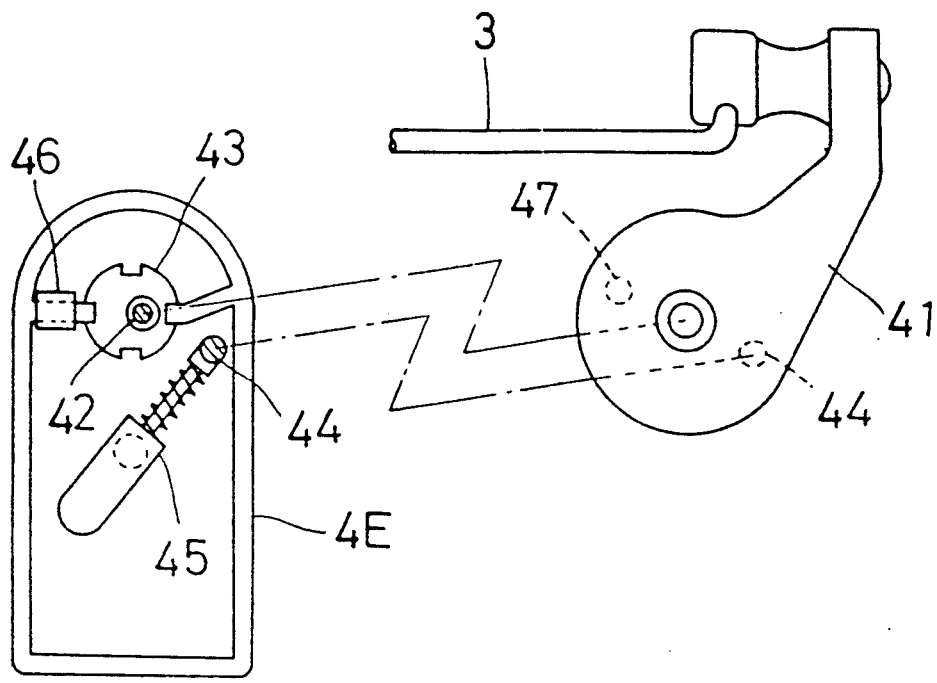
FIG. 9 is a schematic view showing an opening/closing mechanism for a bail arm.

Referring back to FIG.6, to one of a pair of arm portions 4E, 4E of the rotor 4, there is attached an arm level 41 for pivotally supporting the bail arm 3 between its open position and its closed position. Then, as shown in FIG. 9, this arm lever 41 has its support shaft 42 supported to the arm portion 4E through a detachable, eccentric bush 43, so that the eccentric bush 43 can be replaced in accordance with the arm portion 4E.

Figure 10:
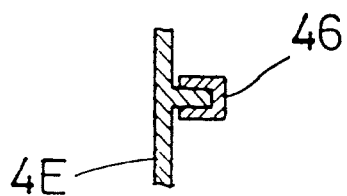
FIG. 10 is a section view of a stopper.

Further, this arm lever 41 receives an urging force of a toggle mechanism 45 through a pin 44; and, as shown in FIG. 10, a stopper 46 is detachably attached to the arm portion 4E, so that the stopper 46 comes into contact with a pin 47 projecting from the arm lever 41 thus determining the line-takeup posture of the bail arm 3.

The advantages of the above-described construction of the invention are that the fixing of the rotor can be reliably effected through the co-use of the bolt element and that the balancer can be appropriately positioned without any increase in the number of components employed.

Figure 11:
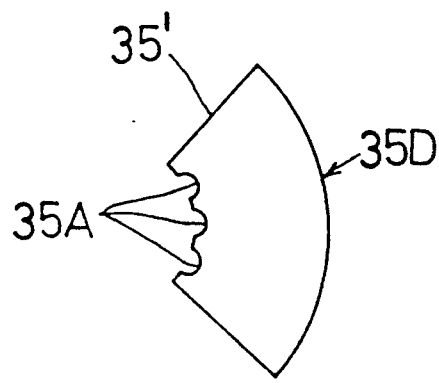
FIG. 11 is a front view of a spinning reel balancer relating to a still further embodiment of the present invention.

A further alternate construction is shown in FIG. 11. In this construction, the balancer 35' includes, at a plurality of positions thereof, cutouts 35A engageable with the bolt element 34. This can assure reliable fixing of the balancer 35' while allowing stepwise adjustment of its balance position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A spinning reel comprising:

a reel body, a handle, a spool, and a spool shaft, said spool shaft having a front end and a rear end, said spool being mounted on said front end of said spool shaft, said spool being located at a front portion of said reel body; and an oscillating mechanism for operatively connecting said handle and said spool shaft, such that said spool shaft and said spool reciprocate in an axial direction in response to rotation of said handle, said axial direction being substantially parallel to said spool shaft, said oscillating mechanism including:

a worm shaft having a peripheral endless groove, said worm shaft being located within said reel body, said worm shaft being substantially parallel to said spool shaft, said worm shaft being rotated in response to rotation of said handle, a transmission member coupled to said worm shaft and being displaceable axially of said worm shaft, said transmission member being fixedly connected to said rear end of said spool shaft, and said transmission member having a through hole of predetermined cross-section, a pawl member, for coupling said transmission member to said worm for converting rotation of said worm shaft into reciprocation of said transmission member in said axial direction, and a guide member of said predetermined cross-section for guiding said transmission member such that said transmission member moves only in said axial direction, said guide member being located within said reel body, said guide member being substantially parallel to said worm shaft, said guide member being encompassed within and slidably engaged with said through hole of said transmission member.

2. A spinning reel as claimed in claim 1, wherein said through hole and said guide member have circular cross-sections.

3. A fishing reel as claimed in claim 1, wherein said transmission member has an upper portion and a lower portion, and said through hole is located in upper portion, said rear end and said spool shaft is fixedly connected to said upper portion, and said worm gear is coupled to said lower portion.

* * * * *